UNITED STATES PATENT OFFICE.

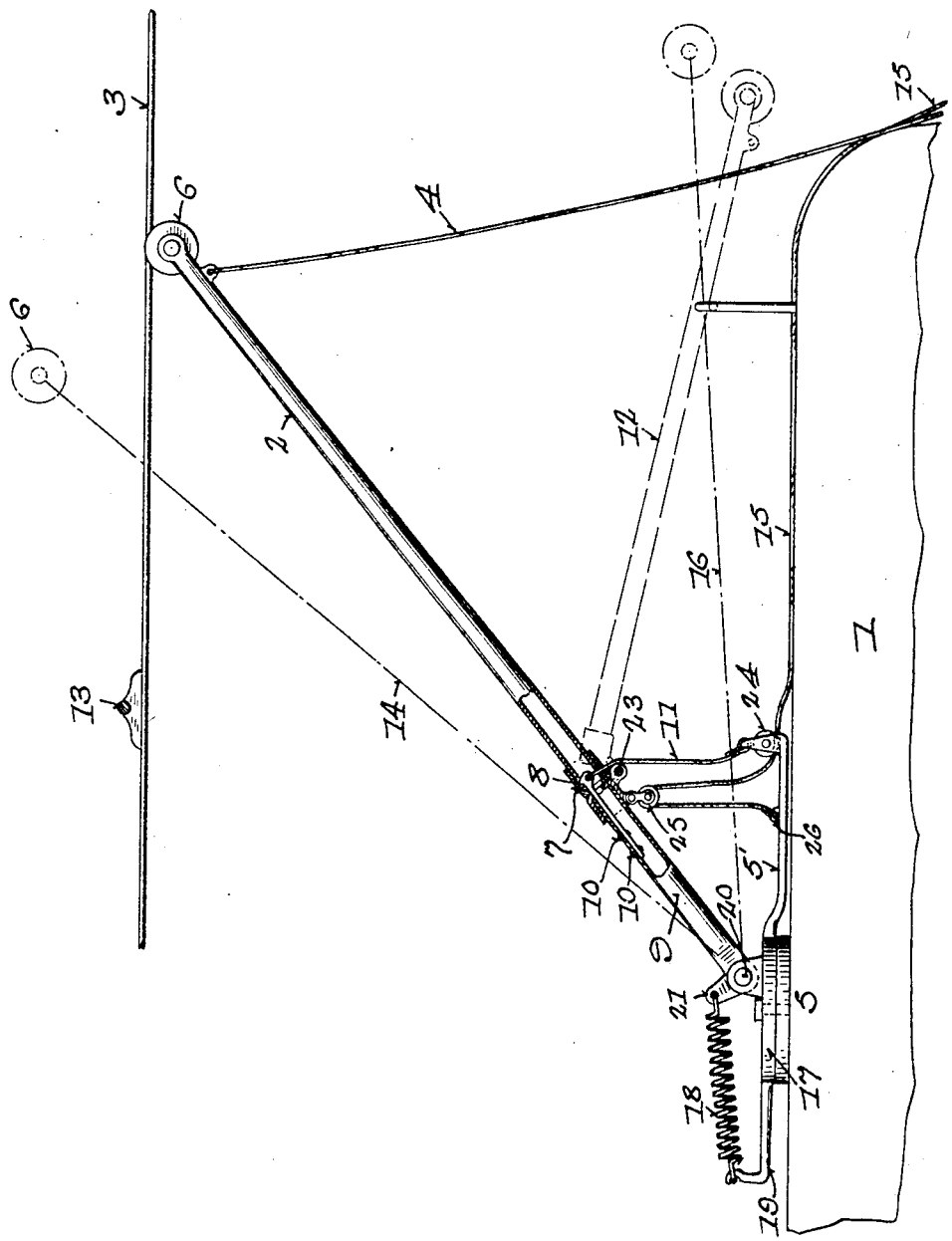

WELLESLEY R. HAMPDEN, OF MILWAUKEE, WISCONSIN, ASSIGNOR OF ONE-HALF TO JOHN C. KLEIST AND ONE-HALF TO WILLIAM F. WOOLARD, BOTH OF MILWAUKEE, WISCONSIN.

TROLLEY-RETRIEVER FOR STREET-CARS.

1,396,367.            Specification of Letters Patent.       Patented Nov. 8, 1921.

Application filed August 28, 1918. Serial No. 251,747.

*To all whom it may concern:*

Be it known that I, WELLESLEY R. HAMPDEN, a citizen of the United States, residing at Milwaukee, county of Milwaukee, and State of Wisconsin, have invented new and useful Improvements in Trolley-Retrievers for Street-Cars, of which the following is a specification.

My invention relates to improvements in street car trolleys, and the same is explained by reference to the accompanying drawing, in which the accompanying figure represents a side view thereof, the purpose of the invention being to retrieve the trolley pole when accidentally disengaged from the trolley wire, and automatically lower the pole into a plane below that of the trolley wire and its supporting stays, so as to eliminate the liability to the breakage of the latter, and thus avoid the interruptions of the service which are usually attendant upon the occurrence of accidents of this kind. The invention also relates to means for restoring the trolley to its operative position with relation to the trolley wire after the disengagement referred to has taken place.

Like parts are referred to by the same reference numerals.

The numeral 1 represents a portion of the roof of a street car, 2 the hinged sectional trolley pole surmounting the same, and 3 the trolley wire from which the power is received from the power station, by which the car is driven. 4 is a cord by which the trolley pole is operated into engagement with the trolley wire. 5 is the device by which the pole is supported upon the roof of the car and is retained yieldingly against the lower side of the trolley wire, and 6 is the trolley roller at the free end of the pole which bears against the lower side of the trolley wire 3. The parts referred to are substantially of ordinary construction. My invention pertains to means for preventing injurious contact of the pole 2 with the stays of the wire 3, when the roller 6 becomes accidentally disengaged from said wire, and the same pertains more especially to the latch 8 on the section 9 which engages the catch 7 on the section 2, to hold the upper section of the trolley pole in alinement with the lower section thereof, as shown. The sections of the trolley pole are hinged, as at 23.

The latch 8 is connected with the lower section 9 by the rivets 10, 10, and said latch is also connected with the arm 5' of the turn table 17 by the cord 11, which cord is placed under tension when the roller 6 leaves the wire 3, and acts to disengage the latch 8 from the catch 7, whereby the upper section of the trolley pole 2 is permitted to turn on the hinge 23 from the operative position shown to that indicated by the dotted line 12, and it is prevented from contacting with the cross supporting wires or stays 13 as the car moves forward under the momentum attained.

When the latch 8 has been disengaged from the catch 7 in the upward movement of the trolley pole 2 to substantially the position shown by the dotted line 14, and the upper section of the pole has fallen to the dotted line position 12, the base section 9 will be pulled downwardly by the operator by drawing upon the cord 15, which passes around the pulley 24 on the arm 5', around the pulley 25 on the section 9 and then secured to the lug 26 on the arm 5'. When said pole reaches the position indicated by the dotted line 16, the section 2 is brought in alinement with the section 9, and the latch 8 will engage the catch 7. Upon the pull on the cord 15 being released the pole will be raised by the spring 18 to the operative position shown by the drawing, with the roller 6 in contact with the trolley wire 3.

The turn-table 17, spring 18, spring supporting arm 19, pivot 20 and arm 21 are substantially all of ordinary construction, and the mechanism herein upon which novelty is predicated consists more especially in the device for locking the section 2 in alinement with the part 9 as shown.

My invention may be conveniently applied to existing systems in which the trolley pole is in tubular form, by merely cutting the pole at an appropriate point, and hinging the sections together. The catch 8 is applied to one section in position to engage the other section, when the said sections are alined. The hinge members may be formed as sleeves which encircle the abutting sections of the trolley pole, as shown in the drawing.

The invention is advantageous over prior structures in the manner of its operation, in that the jointed members of the trolley pole are caused to assume their longitudinal relation with each other while resting in an approximately horizontal plane below that of the trolley wire and its supporting stays, so that the hinged parts of the pole may be coupled in alinement without interference by the trolley wire or its stays. In the case where such coupling is effected by bringing the upper section of the trolley pole into an approximately vertical position to complete such coupling, the presence of a stay for the trolley wire in the path of movement of the upper section of the trolley pole at the time such coupling is attempted, prevents its execution.

In my invention, the lower section of the trolley pole will be pulled down until the two sections are alined, and the coupling is automatically effected. The pole will then be permitted to rise for engagement of the wheel with the trolley wire, without regard to the location of the stays, which otherwise might interfere with the operation.

Having thus described my invention, what I claim as new, and desire to secure by Letters Patent, is:

1. In a device of the described class, a trolley pole formed of two abutting sections hinged together, means at the hinge for retaining such sections in alinement with each other, means for automatically releasing such retaining means, and permitting the upper section of the trolley pole to drop to a position above the car, means for alining the lower section with the dropped section, and means for raising the pole when such sections are brought into alinement with each other.

2. In a device of the described class, a trolley pole formed of two sections pivotally connected together, means at the pivot for locking the upper section in alinement with the lower section, means for automatically disengaging such locking means to release said upper section, means for bringing the sections of the trolley pole into alinement with each other in an approximately horizontal position above the car, and means for raising the trolley pole to bring the same into contact with the trolley wire while the sections are thus alined.

3. A trolley pole release, composed of a tubular lower supporting section, a tubular upper wheel carrying section pivoted thereon, whereby the latter can swing downwardly, an interiorly located catch engaging the sections to hold them in alinement, a flexible connection fixed at one end and attached to the catch at the other, to release the catch when the trolley pole swings above the trolley wire, and permit the wheel carrying section to fall free from engagement with the wire supporting means.

4. A trolley pole release comprising a pole formed of two tubular sections hinged at their abutting ends, means located within the sections to hold them in alinement, and a connection to said holding means to withdraw the latter and permit the upper section to fall away from the trolley wire when the trolley wheel leaves the wire.

5. A trolley pole release comprising a pole formed of two sections hinged at their abutting ends, means on one section at one side of the hinge for engaging with the other section at the other side of the hinge to hold the said sections in alinement, and means to release said engaging means to permit the upper section to fall away from the trolley wire when the trolley wheel leaves the wire.

6. A trolley retriever comprising a jointed trolley pole having means at the joint to hold the sections of the pole in alinement, means to release the upper section of the pole to permit it to fall away from the trolley wire when the trolley pole leaves the said wire, means to draw the lower section into alinement with the fallen section, and means for effecting engagement of the pole with the wire when the sections are alined.

7. A trolley retriever comprising a jointed trolley pole composed of abutting sections, means connected with the pole and at the joint thereof for holding the sections in alinement, a connection with such holding means for effecting the release of the upper section when the connection to the holding means is placed under tension, means for alining the sections, and means for raising the trolley pole when the alining means is released.

8. Means for preventing damage to the lateral supports of a trolley wire, such means comprising a jointed trolley pole the sections of which are hinged at their abutting ends, means at the hinge for holding the sections of the pole in alinement, means for disconnecting the holding means to permit the upper section of the pole to fall when the trolley leaves the wire, and means for re-alining the pole sections in a plane below that of the said lateral supports.

In testimony whereof I affix my signature in the presence of two witnesses.

WELLESLEY R. HAMPDEN.

Witnesses:
O. C. WEBER,
JAS. B. ERWIN.